United States Patent [19]

Froberger et al.

[11] Patent Number: 4,601,799

[45] Date of Patent: Jul. 22, 1986

[54] ELECTRIC FIELD OIL FILTER AND METHOD OF FILTERING

[75] Inventors: Charles F. Froberger, Mt. Clemens; James A. Spearot, Bloomfield Hills, both of Mich.

[73] Assignee: General Motors Corporation, Detroit, Mich.

[21] Appl. No.: 625,517

[22] Filed: Jun. 28, 1984

Related U.S. Application Data

[63] Continuation-in-part of Ser. No. 412,134, Aug. 27, 1982, abandoned.

[51] Int. Cl.$^4$ ............................................. B01D 35/06
[52] U.S. Cl. ................................... 204/181.8; 204/302
[58] Field of Search .............................. 204/302, 104

[56] References Cited

U.S. PATENT DOCUMENTS

| 2,573,967 | 11/1951 | Hamlin | 204/302 |
| 2,925,372 | 2/1960 | Keehn | 204/302 |
| 3,567,619 | 3/1971 | Brown | 204/302 |
| 4,059,498 | 11/1977 | Crissman et al. | 204/302 |
| 4,248,686 | 2/1981 | Gidaspow et al. | 204/181.8 |

FOREIGN PATENT DOCUMENTS 0710561 6/1954 United Kingdom ............... 204/302

Primary Examiner—John F. Niebling
Assistant Examiner—Terryence Chapman
Attorney, Agent, or Firm—D. D. McGraw

[57] ABSTRACT

The filter assembly removes minute soot particles from diesel engine oil during service. It may be used to remove other minute particles from various oils. A charged metal screen, with a mesh size preferably in the range of 2 to 4 holes per linear inch, causes attraction of the minute soot particles. The electric potential causes the particles coagulate to form larger masses which may be filtered by an electrically non-conductive filtering element. Particles also collect on the mesh surface. A D.C electric potential is applied to the screen to create an average electric potential of about 250 or more V/mm between the screen and the grounded electrode.

17 Claims, 6 Drawing Figures

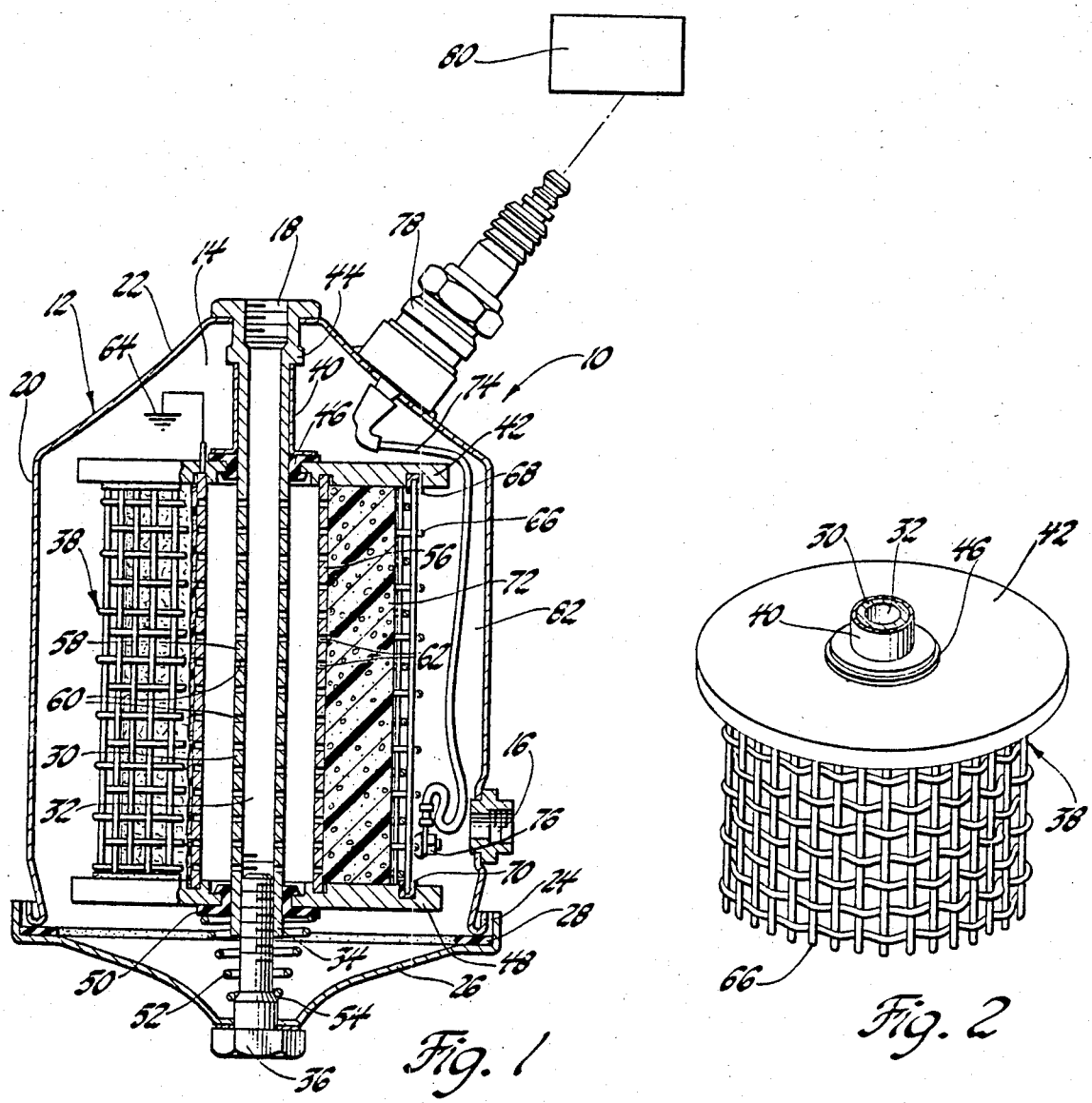
Fig. 1
Fig. 2
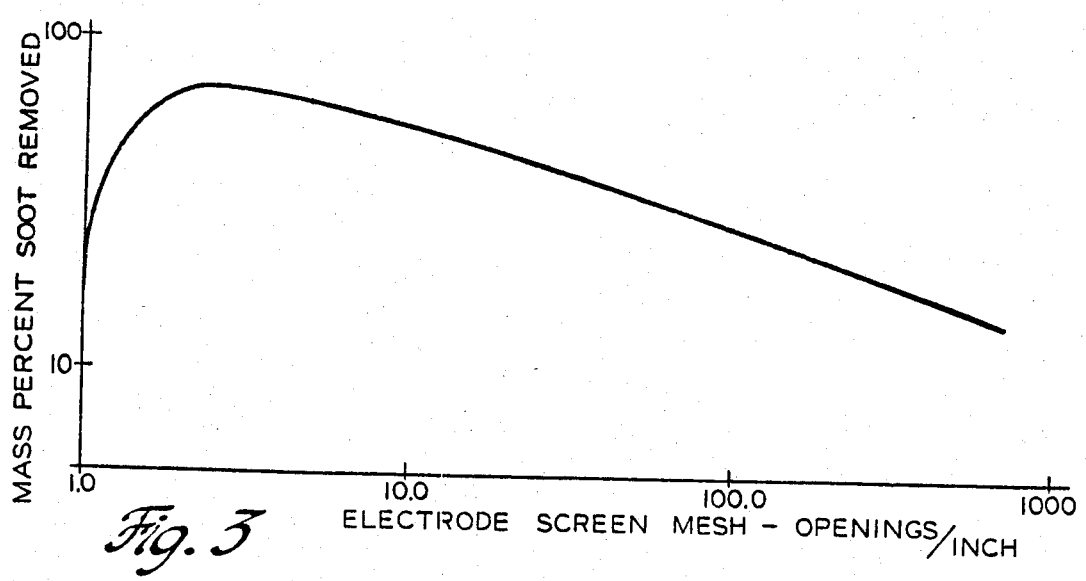
Fig. 3

ELECTRIC FIELD OIL FILTER AND METHOD OF FILTERING

This is a continuation-in-part of U.S. application Ser. No. 412,134, filed Aug. 27, 1982, now abandoned.

The invention relates to a method of filtering or separating particles dispersed in oil and to an oil filter for separating minute soot and other particles from oil during service, and more particularly to such a filter which has a D.C. electrical potential between two open mesh electrodes which causes the particles to coagulate and be trapped in the filter. A filter medium which is electrically non-conductive may be positioned between the two electrodes to assist in collecting the coagulated particles. The filter medium may be a production element of the type in common use with gasoline or diesel oil fueled passenger car and truck engines. It may be a sheet of filter paper positioned against the negatively charged electrode. The filter medium may be omitted so that the space between the electrodes is open.

While it is contemplated that the filter is especially useful in engine lubricating oil systems, and particularly diesel engines, for removing or separating soot particles dispersed therein, it is within the scope of the invention that it be used in other hydraulic fluid systems having extremely minute particles suspended therein and requiring removal. The description will be hereafter directed to the removal of soot particles in engine lubricating oil, it being understood that the invention may be more broadly applied. Soot particles dispersed in diesel engine lubricating oil may commonly range in size from 0.005 micron to about 1.0 micron in diameter. The mesh electrodes may have mesh openings much larger than this, preferably on the order of 1.5 to 10 mesh openings per linear inch. Therefore, the mesh openings of about 10 openings per linear inch, allowing for about 25% of each linear inch of electrode screen to be screen material defining the mesh openings, as illustrated in FIGS. 1 and 2 by way of example, are about 3,000 times as large as the dispersed soot particles at the larger range end, and much more than that in relation to the smaller dispersed soot particles. Even other types of particles on the order of 30 to 60 microns in diameter, like those usually filtered by an ordinary production type engine oil filter, may be 50 or more times smaller than the mesh openings of such electrodes. With 4 mesh openings per linear inch and about 25% screen material per linear inch, each opening would be about 0.1875 inches which is approximately 7,500 times as large as a 1 micron soot particle, and 125 times as large as a 60 micron particle of metal or dirt, for example. With 1.5 mesh openings per linear inch and about 25% screen material per linear inch, each opening would be about 0.5 linear inch. Considering that some particles to be separated may be in a size range up to about 100 microns maximum diameter, the openings in a size range from about 1.5 to 10 openings per linear inch, and thus having diameters or widths and breadths of about 0.5 inch to 0.0725 inch, remain several times larger than the particles or other undesirable matter to be separated. Other size relationships are readily calculated within the preferred ranges given. Therefore, the mesh openings in the electrodes are substantially larger than the dispersed particles suspended in the oil being filtered, and provide substantially no mechanical impedance to the flow therethrough of individual or unitary particles dispersed or suspended in the oil flowing through the filter assembly.

It is also advantageous to maximize the metallic surface area of each electrode. A suitable combination of surface area per wire and the number of wires forming the electrode mesh will maximize electrode surface area. It has been found that electrodes with mesh openings of 2 to 4 openings per linear inch, with screen material occupying about 15% to 30% of each linear inch of electrode screen, obtain the best overall results, although screen electrodes with mesh openings of 1.5 to 10 openings per linear inch, with a similar percentage of screen material, will perform acceptably. By use of the electrodes proposed herein, a full-flow filter element which has a nominal pore size of about 40 microns, or in the range of about 8 to 100 microns, may be used to assist in collecting coagulated soot particles even though the filter element, without such coagulation, would not remove any of the suspended soot particles. If no filter element is used, coagulated soot particles will remain attracted to the positively charged electrode, and thus be effectively separated or removed from circulation in the lubrication system.

It has also been found that the magnitude of the D.C. electrical potential between the electrodes is preferably a function of the separation of the electrodes to obtain the most efficient removal of the soot particles from the oil. An effective potential has been found to be on the order of 250 volts D.C. per millimeter of electrode separation. Other factors that effect the separation efficiency are the mobility of the dispersed soot particles in the oil and the presence or absence of certain additives. Soot particle mobility may be increased by decreasing the viscosity of the oil, increasing the average number of charges per soot particle, and/or establishing an oil temperature which is elevated above ambient but not so high as to adversely effect the mechanical equipment in which it is being used. An effective oil temperature range is about 93° C. to 120° C.

IN THE DRAWING

FIG. 1 is a cross-section view, with parts broken away, of a filter assembly embodying the invention.

FIG. 2 is a perspective view of a portion of the filter of FIG. 1, particularly showing one of the electrodes of that filter.

FIG. 3 is a graph showing the relationship of the electrode screen mesh openings per linear inch in relation to the mass percent soot removed in a predetermined period of time.

Figure 4:
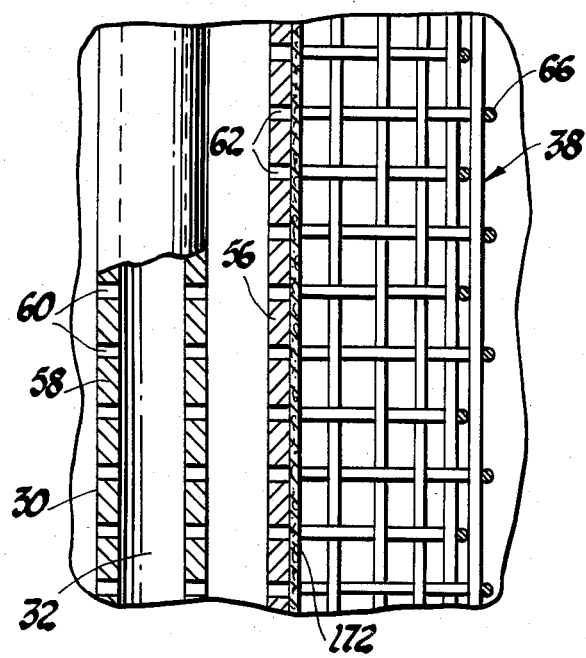
FIG. 4 is a fragmentary cross-section view of a filter assembly similar to that shown in FIG. 1, with the filter element being a thin filter paper set against the flow entry side of the second, negatively charged, electrode.

Throughout the history of the use of diesel engines, one of the concerns has been the generation of a relatively large amount of carbonaceous soot particles as a combustion product. The soot particles so generated contribute to a visible problem of smoke associated with diesel engine exhaust and to less visible problems such as engine lubrication. Once the soot particles are suspended in the lubricating oil, they have the effect of increasing the viscosity of the lubricant, making engine starting more difficult and interfering with antiwear additives. This results in requiring special metallurgical considerations for the valve train and other potentially high wear rate components, increasing the cost of the engine. It also requires more frequent oil change intervals to prevent the concentration of soot particles in the oil from exceeding acceptable limits.

Although it would be desirable to decrease the amount of soot particles generated, and this can be accomplished to some extent by combustion chamber design and engine operation, it is also important to deal with the soot particles after they have been suspended or dispersed in the lubricating oil. Filtration of these particles is complicated by their minute size. Automotive oil filters commonly used to filter lubricating oil in gasoline engines are designed to remove particles which are 20 to 40 microns or greater in diameter. In contrast, the soot particles found to be suspended in used diesel engine lubricating oil are generally under 1.0 micron in diameter and often range from 0.005 to 0.25 micron in diameter. Thus, little, if any, of the soot particles may be removed by commercial oil filters of the type in common use at this time.

Previous investigations have shown that soot particles in a diesel exhaust gas stream exhibit a positive electrical charge of unknown origin. Used diesel engine oil samples have been examined to determine if these charges remain on the soot in the lubricating oil. It has been found that the lubricating oil soot particles were negatively charged, in opposition to the positive charge on exhaust gas soot particles. Under the influence of a D.C. electrical potential they will move in the direction toward a positively charged electrode. The source of such charges on the soot particles is believed to be the combustion process in the engine. When acted upon by the D.C. electric potential of an electrically charged filter, the soot particles are attracted toward the positively charged electrode and concentration of soot particles in the vicinity of the electrode surface increases. The ability of the oil to hold the soot particles in suspension will be exceeded and the particles will then deposit on the positive electrode surface or coagulate with other particles in the vicinity of the positively charged electrode to form aggregates or masses sufficiently large to be removed from the system or filtered from the oil downstream of the positively charged electrode. The rate of soot coagulation under the influence of the D.C. electric potential is preferably such that a suitable filtering element of substantially larger pore size than that of the suspended soot particles will effectively trap globules which detach from the positively charged coagulated soot while minimizing resistance to the flow of oil through the filter. Rate of soot removal from the oil is affected by flow rate and oil temperature as well as the amount of electric potential, the screen mesh size of the electrode, and the surface area of the electrode. Electrically induced coagulation of these charged soot particles effectively increases the filtration efficiency of a standard filter medium.

The filter assembly 10 of FIG. 1 includes a housing 12 formed to provide therein a filter chamber 14, an oil inlet 16 and an oil outlet 18. While shown with the inlet 16 near the lower part of the assembly 10 and the outlet 18 at the upper part, the filter will perform quite well in the inverse position, upside down from that illustrated in FIG. 1. The following description is therefore used with the assembly in the position of FIG. 1, and is not to preclude inverse installation in the disclosure or in the claims. The housing has an upper section 20 with inlet 16 formed in the lower side thereof. The housing upper section 20 is illustrated as being substantially circular, with a closed top portion 22 and an open lower end 24. The housing lower section 26 fits over and closes the lower end 24 of the housing upper section. A suitable seal 28 is provided between the two sections to prevent oil leakage. A center support tube 30 extends axially through the upper housing section 20 and has the outlet 18 formed at its upper end. A passage 32 within the tube 30 is the outlet flow passage of the filter assembly 10. The lower end 34 of tube 30 is internally threaded and receives threaded bolt 36 therein. This bolt also extends through the lower housing section 26 and acts to hold the lower housing section tightly against the upper housing section. A removable filter section 38 is received about tube 30 and is normally positioned within the circular portion of upper housing section 20. A spacer 40 between the upper plate 42 of filter section 38 and a suitable flange 44 on the upper end of tube 30 defines the desired location of the filter section on the tube. Seal 46 also permits resilient sealing engagement between the plate 42 and spacer 40.

Filter section 38 has a lower plate 48 provided with a seal 50 similar to seal 46. Seal 50 seals against plate 48 and the outer surface of support tube 30. A compression spring 52 is positioned against the lower surface of seal 50 and a shoulder 54 on bolt 36 so that the spring resiliently holds the filter section 38 against spacer 40.

A cylindrical filter support member 56 is fitted in grooves in the upper and lower plates 42 and 48 so that it surrounds the center portion 58 of support tube 30 located between the upper plate 42 and the lower plate 48. The tube center portion 58 has a series of axially and circumferentially spaced openings 60 extending therethrough at an angle to the tube axis. These openings may be perpendicular to that axis. The filter support member 56 is also provided with similar openings 62, or may be of a mesh construction such as that of electrode 66 described below. The openings are hereinafter referred to as mesh openings, the term to include both woven and non-woven constructions. These mesh openings are of macro size so that they do not, because of their size, impede the flow of soot particles suspended in the oil. Openings 60 and 62 have cumulative areas which permit oil flow therethrough without any substantial restriction. They may be of various shapes, and their sizes may be measured by diameter, width and breadth, or linear inch. Filter support member 56 also acts as one of the electrodes of the filter assembly, and is electrically grounded as schematically illustrated at 64. In an installation where the electric ground is negative, electrode and filter support 56 will therefore be negatively charged.

A screen electrode 66 is also mounted between upper plate 42 and lower plate 48. Electrode 66 is also circular, with one end engaging an insulator 68 positioned in a groove of upper plate 42 and other end positioned in an insulator 70 located in a groove formed in lower plate 48. Electrode 66 is concentrically disposed about the electrode and filter support member 56 so that there is a substantially constant spaced relation. A non-conductive filter element 72 is positioned between the electrodes 56 and 66 and is supported by the electrode and filter support member 56. Filter element 72 may be of the type generally used commercially, and may have a pore size in the 20 to 40 micron range or even larger. The larger pore size provides less restriction to oil flow than filter elements of a smaller pore size, and particularly so in relation to filter elements having a sufficiently small pore size to mechanically filter any substantial amount of the suspended soot particles without an electrical field being imposed. In some instances, the filter element may have a nominal pore size in a range of 8 to 100 microns.

Alternatively, the filter element may be a thin filter element of such pore size as noted above and shown as element 172 in FIG. 4. It primarily functions to prevent coagulated soot particles which have become detached from the positively charged electrode 66 from passing through electrode and filter support member 56, and may function to trap any particles which may be dispersed in the oil with a maximum diameter greater than the nominal pore size of the particular filter element used. It will also coact with the coagulated masses of soot particles to trap other undesirable matter than soot which may be suspended in the oil without regard to whether the filter element pores are smaller or larger than the other such matter to be separated or filtered.

An electrical lead 74 is connected by a connector 76 to electrode 66 at one end and to an electrical feed connector 78 at the other end. Connector 78 is mounted in the upper part of housing section 20 above upper plate 42. It is also connected to a suitable source 80 of D.C. electrical potential. Electrical lead 74 is sufficiently long to permit the removal of filter section 38 after removing bolt 36 and housing section 26 to such an extent that connector 76 may be disconnected and the filter section then completely removed.

It can therefore be seen that the inlet 16 opens into a generally circular chamber section 82 of chamber 14 extending about the filter section 38. Oil entering inlet 16 must pass through the mesh openings of electrode 66, then through filter element 72, then through openings 62 of electrode and filter support member 56, then through openings 60 of support tube 30, and through the tube passage 32 to the outlet 18. There is no substantial flow through the portions of chamber 14 above plate 42 or below plate 48 unless portions of the circumferential surface of filter section 38 become so clogged that the oil must flow over or under part of the filter section to be able to pass therethrough to outlet 18.

FIG. 2 shows a portion of the filter section 38 and particularly illustrates a wire mesh construction suitable to make the screen electrode with stainless steel wire. The screen electrode illustrated is of the type having 2 to 4 mesh openings per linear inch. In the case of electrodes having a low mesh opening count, there is a relatively large surface area per wire, but relatively few wires per electrode. When the electrode has a high mesh opening count, there is relatively little surface area per wire, but a large number of wires per electrode. For an optimum electrode there is a combination of surface area per wire and number of wires that maximizes the total electrode surface area. It has been found that electrodes with mesh openings of 2 to 4 openings per linear inch and the screen material occupying about 15% to 30% of the space per linear inch obtain the best overall results, although screen electrodes with mesh openings of 1.5 to 10 openings per linear inch and proportionate screen material will perform acceptably. FIG. 3 is composed of a graph illustrating the effect in the number of mesh openings per linear inch in electrode 66, plotted in terms of the mass percent of soot removed over a predetermined period of time.

It is within the concept of the invention to use screen electrodes made in a manner other than woven wire mesh, although such woven mesh screens are preferred. Thus the screen electrodes may be made of sheet metal with openings formed therein in various manners such as punched openings or expanded metal openings. The openings may be in the form of circles, diamonds, squares, slots, etc. Therefore their dimensions may be expressed as diameters, maximum diameters, width and breadth, or linear inch.

Various filter media forming the filter element 72 may be used, including those used in current engine lubricating oil filters. These may have pore sizes of from about 8 to 40 microns. Others may range from about 8 to 100 microns. Examples may include membranes formed of a pure, biologically inert mixture of cellulose acetate and cellulose nitrate; a filter medium of the type currently used in production of automotive diesel engine oil filters and made of hardwood and southern pine pulps and polyester fiber; and various combinations of asbestos fiber, glass fiber and/or wood pulp. One of the more effective filter media has been found to be composed of nylon together with glass fiber in a mass ratio of 2:3 with an effective pore size greater than 40 microns and in a size range as high as about 100 microns. This has produced a good single-pass filter efficiency, while obtaining a relatively smaller pressure drop across the filter element because of the larger pore size.

It has also been found that oil flow rate has an effect on single-pass filter efficiency. As the oil flow rate was decreased from a relatively high rate, the single-pass filter efficiency increased. Since the total amount of oil passing through the filter in any given time period decreases as the flow rate was reduced, there is a flow rate range which provides a near optimum flow rate at which a near maximum amount of soot particles are removed from a given quantity of oil in a given period of time. This near optimum flow rate will vary, based upon the construction of the filter element and other factors including the voltage across the electrodes and the temperature of the oil.

Figure 5:
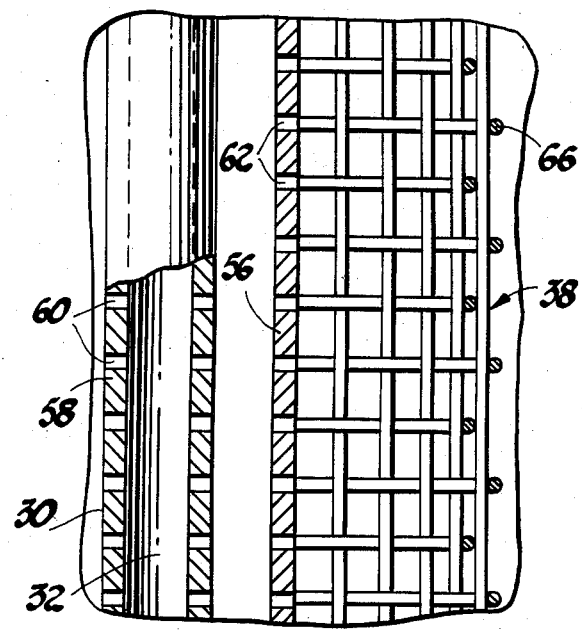
FIG. 5 is a fragmentary cross-section view of another filter assembly similar to that shown in FIG. 1, with the filter element between the electrodes being omitted so that the filter assembly operates without a filter element.
Figure 6:
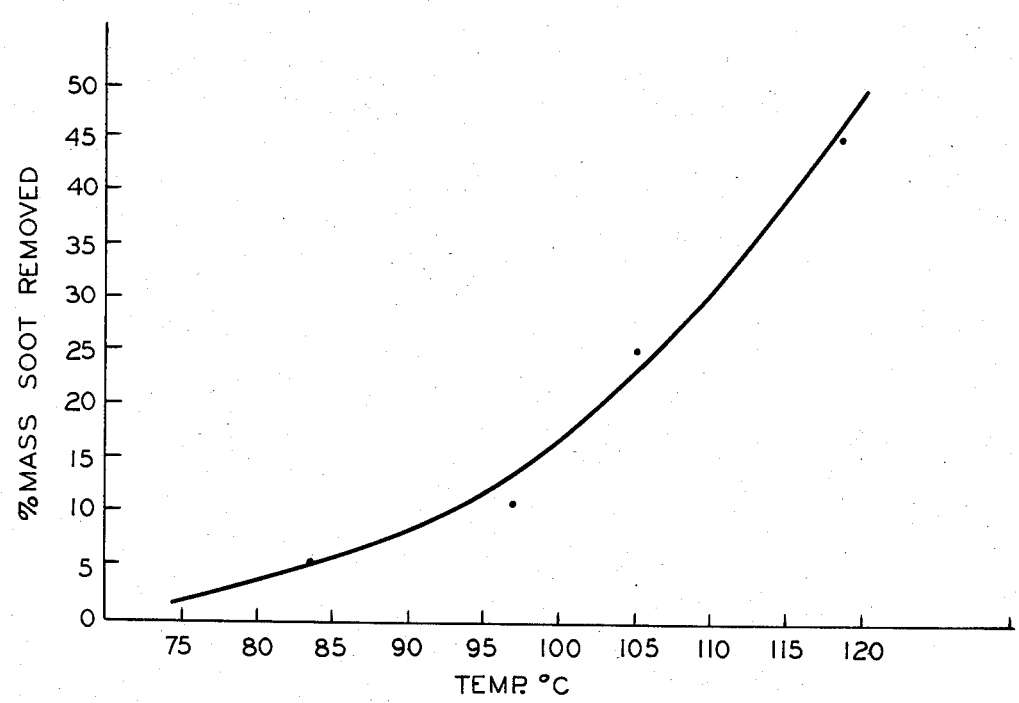
FIG. 6 is a composite graph of data obtained under various operating conditions, showing the variations in mass percent soot removal in relation to the temperature of the oil.

It has been found that the filter assembly will remove a portion of the soot particles even if no filter element 72 is provided. This arrangement is illustrated in FIG. 5. The soot particles are coagulated upstream of the electrode 56, being attracted to the positively charged electrode 66, and aggregated into coagulated masses which are usually too large to pass through the openings 62 of electrode 56 should they break off from electrode 66. While this does not give the filter efficiency obtainable with the use of a suitable filter element 72 in the assembly, it is helpful to have an assembly which will provide some soot removal even if a filter element is temporarily not available. Under some conditions of operation where smaller quantities of soot are produced and suspended in the lubricating oil, this arrangement may be satisfactory as a standard procedure.

The temperature of the oil also has an effect on filter efficiency. For example, oil at a temperature at 93° C. improved the single-pass filter efficiency 2 to 4 times as compared to oil at 66° C., depending upon flow rate, with a medium flow rate being better than a high flow rate. It is believed that the physical properties of the soot in suspension in the oil, and particularly the average number of electrical charges per particle, have an equally significant effect, and may account for the increase in filter efficiency as oil temperature is increased. The oil viscosity is reduced with increased oil temperature, increasing the mobility of the soot particles in the oil. The mobility of soot particles through the oil under influence of an electric field is related to the average number of electrical charges per particle and is a function of the viscosity of the oil and the average particle radius. Since increased oil temperature reduces the oil viscosity and increases particle mobility and the average number of charges per particle, with an increase in filter efficiency, it can be seen that this increase in filter efficiency may well relate to the average number of electrical charges per particle. It appears that whatever acts to increase the mobility of the soot particles in the oil will increase the amount of soot filtered. Other factors which contribute to increased particle mobility, such as changes in oil additive compositions or engine operating conditions, will increase the efficiency of the filter assembly. There have also been found to be upper limitations of the amount of flow rate and oil temperature. Slow flow rates and high oil temperatures result in electrical short circuiting through the oil being filtered quicker than do medium to high oil flow rates and low engine temperatures.

Other factors that affect the filtration of the soot particles include the concentration and types of detergents and dispersant additives. Soot concentration reductions are improved by minimizing or eliminating ashless dispersant from the oil, for example. Some detergent additives such as calcium salicylate also tend to inhibit coagulation of the soot particles and should be used sparingly or omitted. Other detergent additives such as calcium phenate and magnesium sulfonate do not appear to inhibit coagulation of the soot particles.

Filter assemblies using a D.C. electric potential for coagulation of soot particles dispersed in an engine lubricating oil have been found to be effective with large mesh openings in the electrodes, such mesh openings being substantially larger than any of the dispersed soot particles, the electric potential acting on the previously charged soot particles to tend to gather the soot particles near the oppositely charged electrode so that the particles form coagulated masses which do not pass through the filter assembly. It is important to use a D.C. electric potential of about 250 volts or more per millimeter of electrode separation to obtain meaningful coagulation of the soot particles while maintaining adequate flow through the assembly. Lesser voltages, on the order of about 125 volts/mm or less, do not provide sufficient attractive power to cause the necessary coagulation, and may result in release of the particles without coagulation when the electric potential is discontinued, tending to permit them to be redispersed in the oil if flow continues or is resumed. All indications are that voltages of a higher order will increase the amount of soot particles removed within a given time period, thus further increasing the efficiency of the assembly. It is therefore within the scope of our invention to use such higher order voltages even though the best results obtained to date have been obtained with about 250 volts/mm electrode separation. The upper voltage limit is controlled by the effects on the oil, additives in the oil, and the electrodes and other parts of the assembly; the economics and practicality of supplying such higher order voltages; and their effects on other operating systems of a vehicle in which the assembly may be installed, for example. It is contemplated that voltages in the range from 250 to about 2,000 volts/mm of electrode separation will result in more efficient soot particle separation, and the range may extend even higher.

The assembly will be effective with a filter element having a pore size range of about 8 to 40 microns which will trap the coagulated masses even though the filter element pores are substantially larger (e.g., 8 to 8,000 times as large) than the dispersed soot particles. The assembly will be sufficiently effective even with a large pore filter element having a pore size range of about 40 to 100 microns, for example, which will trap the coagulated masses even though the pores are substantially larger (e.g., 40 to 20,000 times as large) than the dispersed soot particles. A larger pore filter element permits the operation of the filter assembly with a lesser pressure drop than would be the case if the filter element had to have a pore size smaller than the size of the dispersed soot particles. It has been found that with a substantial amount of coagulated soot masses retained in the filter assembly, the oil passing therethrough forms sufficient passages through the coagulated masses to flow within acceptable limits even though the appearance of the coagulated masses would tend to lead a casual observer to the conclusion that the coagulated masses had completely clogged up the filter element. For example, it has been found that the coagulated masses may occupy substantially all of the volume defined by electrodes 56 and 66 and upper and lower plates 42 and 48, and may even be on the upstream side of electrode 66 before the filter section 38 must be removed for replacement of the filter element 72 and cleaning of the electrodes.

The embodiments of the invention in which an exclusive property or privilege is claimed are defined as follows:

1. In an oil filter assembly for removing particles of soot or the like particularly including soot particles of about 1.0 micron and less in diameter and dispersed in oil passed through the filter assembly, a filter housing having an inlet and an outlet, a first electrode having a mesh configuration with openings sufficiently large to let pass therethrough all of the dispersed particles, said first electrode being so positioned in said filter housing that oil and said dispersed particles suspended in the oil entering said inlet must flow through the mesh openings of said first electrode toward said outlet, means including a filter element having a pore size sufficiently larger than said dispersed soot particles so as to provide no restriction to the flow therethrough of the individual soot particles suspended in the oil, and a second electrode having an open mesh configuration with openings sufficiently large to let pass therethrough all of the dispersed particles suspended in the oil, said second electrode being positioned in said filter housing at a substantially constant distance from said first electrode so that oil flowing through the mesh openings of said first electrode must then flow through said filter element and then the mesh openings of said second electrode to said outlet, and means for establishing and maintaining a D.C. electric potential between said first and second electrodes on the order of 250 or more volts D.C. per millimeter of electrode separation, the amount of electric potential being determined in part by the substantially constant distance separating said first and second electrodes, said electric potential when so established and maintained effecting an attraction of said soot particles in the oil toward said first electrode and a concentration of said soot particles in the vicinity of said first electrode sufficient to cause said soot particles to coagulate between said electrodes, the coagulation thus effected creating a sufficiently large resultant mass which cannot pass through said filter element to the mesh openings of the second electrode, and is thereby retained en masse and in situ by the oil filter assembly downstream from the first electrode for subsequent removal from said assembly.

2. In an oil filter assembly for removing particles particularly including soot particles of about 1.0 micron and less in diameter and dispersed in suspension in oil to be filtered as it is passed through the filter assembly,
 a filter housing having an inlet and an outlet,
 a first electrode having openings therethrough which are sufficiently large to let pass therethrough all of the dispersed particles, said first electrode being so positioned in said filter housing that oil and dispersed particles in the oil entering said inlet must flow through said openings of said first electrode toward said outlet;
 a second electrode having openings therethrough which are sufficiently large to let pass therethrough all of the dispersed particles, said second electrode being positioned in said filter housing at a substantially constant distance from said first electrode so that oil flowing through said openings of said first electrode fills the space between said electrodes and flows through said openings of said second electrode to said outlet;
 and means for establishing and maintaining a D.C. electric potential between said first and second electrodes, the amount of electric potential being determined at least in part by the substantially constant distance separating said first and second electrodes and being on the order of 250 to about 2,000 volts D.C. per millimeter of electrode separation, said electric potential when so established and maintained effecting an attraction of said soot particles toward said first electrode and coagulating particles in the oil passing through said filter assembly so that the coagulated mass of particles does not pass through and beyond said second electrode, but is retained in the filter assembly between said first electrode and said second electrode and is subject to periodic removal.

3. In an oil filter assembly for removing particles of soot or the like particularly including soot particles of about 1.0 micron and less in diameter and dispersed in oil passed through the filter assembly,
 a filter housing having an inlet and an outlet,
 a first electrode having openings therethrough which are sufficiently larger than the dispersed particles to permit the dispersed particles to flow therethrough with oil in which they are dispersed, said first electrode being so positioned in said filter housing that oil entering said inlet must flow through said openings of said first electrode to said outlet;
 a second electrode having openings therethrough which are also sufficiently larger than the dispersed particles so as to be capable of permitting individual dispersed particles to flow therethrough with oil in which they are dispersed, said second electrode being positioned in said filter housing at a substantially constant distance from said first electrode so that oil flowing through said openings of said first electrode must then flow through said openings of said second electrode to said outlet;
 a non-conductive particle filter element located in the oil flow path between said first electrode and said second electrode;
 and means for establishing and maintaining a D.C. electric potential between said first and second electrodes, the amount of electric potential being determined at least in part by the substantially constant distance separating said first and second electrodes and being on the order of 250 or more volts D.C. per millimeter of electrode separation, said electric potential when so established and maintained coagulating soot particles in the oil passing through said filter assembly by attracting the soot particles toward the first electrode so that the coagulated mass of soot particles does not pass through and beyond said second electrode, but is retained in the filter assembly between said electrodes and is subject to periodic removal.

4. In an oil filter assembly for removing particles of soot or the like particularly including soot particles of about 1.0 micron and less in diameter and dispersed in oil passed through the filter assembly,
 a filter housing having an inlet and an outlet,
 a first electrode having a large mesh opening configuration with mesh openings sufficiently large to let pass therethrough all of the dispersed particles, said first electrode being so positioned in said filter housing that oil entering said inlet must flow through the mesh openings of said first electrode toward said outlet;
 an electrically non-conductive filter element having a pore size sufficiently large to let pass therethrough all of the dispersed soot particles,
 a second electrode having a large mesh configuration with mesh openings sufficiently large to let pass therethrough all of the dispersed particles, said second electrode being positioned in said filter housing at a substantially constant distance from said first electrode with said filter element therebetween so that oil flowing through the mesh openings of said first electrode must then flow through said filter element and then through the mesh openings of said second electrode to said outlet;
 and means for establishing and maintaining a D.C. electric potential between said first and second electrodes, the amount of electric potential being determined in part by the substantially constant distance separating said first and second electrodes and being on the order of 250 or more volts D.C. per millimeter of electrode separation, said electric potential when so established and maintained acting to attract soot particles in the oil passing through said filter assembly toward said first electrode and coagulate the soot particles so attracted into larger masses of greater size than the pore size of said filter element so that the coagulated masses of particles do not pass through and beyond said second electrode, but are retained in the filter assembly and are subject to periodic removal.

5. In an oil filter assembly for removing particles of soot or the like dispersed in oil and having a size range of about 0.005 micron to 1.0 micron,
 a filter housing having an inlet and an outlet, a first electrode having a large mesh configuration with mesh openings having a mesh size range of 1.5 to 10 openings per linear inch and sufficiently large to let pass therethrough all of the dispersed particles, said first electrode being so positioned in said filter housing that oil entering said inlet must flow through the mesh openings of said first electrode to said outlet;

an electrically non-conductive filter element having a pore size substantially larger than the size range of the dispersed particles;

a second electrode having a large mesh configuration with mesh openings sufficiently larger than the size range of the dispersed particles to be capable of letting the dispersed particles pass therethrough, said second electrode being positioned in said filter housing at a substantially constant distance from said first electrode with said filter element therebetween so that oil flowing through the mesh openings of said first electrode must then flow through said filter element and then through the mesh openings of said second electrode to said outlet;

and means for establishing and maintaining a D.C. electric potential between said first and second electrodes, the amount of electric potential being determined in part by the substantially constant distance separating said first and second electrodes and being on the order of 250 to 2,000 volts D.C. per millimeter of electrode separation, said electric potential when so established and maintained acting to attract particles in the oil passing through said filter assembly toward said first electrode and coagulating the particles so attracted into large masses of greater size than the pore size of said filter element and of greater size than the mesh openings of said second electrode so that the coagulated masses of particles do not pass through and beyond said second electrode, but are retained in the filter assembly and are subject to periodic removal.

6. In an oil filter assembly for removing particles of soot or the like dispersed in oil and having a size range of about 0.005 micron to 1.0 micron in diameter, a filter housing having an inlet and an outlet, a first electrode having a large mesh configuration with mesh openings having a mesh size range of 2 to 4 openings per linear inch, said mesh openings being sufficiently large to let pass therethrough all of the dispersed particles, said first electrode being so positioned in said filter housing that oil entering said, inlet must flow through the mesh openings of said first electrode to said outlet;

an electrically non-conductive filter element having a minimum pore size sufficiently large to let pass therethrough all of the dispersed particles;

a second electrode having a large mesh configuration with mesh openings sufficiently large to let pass therethrough all of the dispersed particles, said second electrode being positioned in said filter housing at a substantially constant distance from said first electrode with said filter element therebetween so that oil flowing through the mesh openings of said first electrode must then flow through said filter element and then through the mesh openings of said second electrode to said outlet;

and means for establishing and maintaining a D.C. electric potential between said first and second electrodes, the amount of electric potential being determined in part by the substantially constant distance separating said first and second electrodes, said electric potential when so established and maintained acting on particles in the oil passing through said filter assembly to attract the particles toward said first electrode and coagulating the particles so attracted into large masses of greater size than the maximum pore size of said filter element and of greater size than the mesh openings of said first and second electrodes so that the coagulated masses of particles do not pass through and beyond said second electrode, but are retained in the filter assembly and are subject to periodic removal.

7. In an oil filter assembly for removing particles of soot or the like dispersed in oil and having a diameter size range of about 0.005 micron to 1.0 micron, a filter housing having an inlet and an outlet, a first electrode having a large mesh configuration with mesh openings of a mesh size and an effective mesh material surface area which cooperate to give a substantially maximized first electrode surface area, said mesh openings being sufficiently large to let pass therethrough all of the dispersed particles, said first electrode being so positioned in said filter housing that oil entering said inlet must flow through the mesh openings of said first electrode to said outlet;

an electrically non-conductive filter element having a pore size sufficiently large to let pass therethrough all of the dispersed particles;

a second electrode having a large mesh configuration with mesh openings sufficiently large to let pass therethrough all of the dispersed particles, said second electrode being positioned in said filter housing at a substantially constant distance from said first electrode with said filter element therebetween so that oil flowing through the mesh openings of said first electrode must then flow through said filter element and then through the mesh openings of said second electrode to said outlet;

and means for establishing and maintaining a D.C. electric potential of at least 250 volts per millimeter of electrode separation between said first and second electrodes, the amount of electric potential being determined in part by the substantially constant distance separating said first and second electrodes, said electric potential when so established and maintained acting to attract particles in the oil passing through said filter assembly toward said first electrode and coagulating the particles so attracted into large masses of greater size than the pore size of said filter element and of greater size than the mesh openings of said first and second electrodes so that the coagulated masses of particles do not pass through and beyond said second electrode, but are retained in the filter assembly and are subject to periodic removal.

8. In an oil filter assembly for removing particles of soot of about 1.0 micron maximum diameter and dispersed in oil, a filter housing having an inlet and an outlet, a first electrode having a large mesh opening configuration with mesh openings sufficiently large to let pass therethrough all of the soot particles, said first electrode being so positioned in said filter housing that oil entering said inlet must flow through the mesh openings of said first electrode to said outlet;

a second electrode having a large mesh configuration with mesh openings sufficiently large to let pass therethrough all of the dispersed particles, said second electrode being positioned in said filter housing at a substantially constant distance from said first electrode;

an electrically non-conductive filter element having a pore size sufficiently large to let pass therethrough all of the dispersed particles and positioned between said first and second electrodes so that oil flowing through the mesh openings of said first electrode must then flow through said filter element and then through the mesh openings of said second electrode to said outlet;

and means for establishing and maintaining a D.C. electric potential between said first and second electrodes, said electric potential being on the order of 250 D.C. volts per millimeter of substantially constant distance separating said first and second electrodes, said electric potential when so established and maintained acting on particles in the oil passing through said filter assembly to attract the particles toward said first electrode and coagulating the particles so attracted into large masses of greater size than the pore size of said filter element and of greater size than the mesh openings of said first and second electrodes so that the coagulated masses of particles do not pass through and beyond said second electrode, but are retained in the filter assembly and are subject to periodic removal.

9. In an oil filter assembly for removing negatively charged soot particles of about 1.0 micron maximum diameter and dispersed in oil, a filter housing having an inlet and an outlet, a first electrode having a large mesh configuration with mesh openings sufficiently large to let pass therethrough all of the dispersed soot particles, said first electrode being so positioned in said filter housing that oil entering said inlet must flow through the mesh openings of said first electrode to said outlet;

a second electrode having a large mesh configuration with mesh openings sufficiently large to let pass therethrough all of the dispersed soot particles, said second electrode being positioned in said filter housing at a substantially constant distance from said first electrode;

an electrically non-conductive filter element having a pore size sufficiently large to let pass therethrough all of the dispersed soot particles and positioned between said first and second electrodes so that oil flowing through the mesh openings of said first electrode must then flow through said filter element and then through the mesh openings of said second electrode to said outlet;

and means for establishing and maintaining a D.C. electric potential of about 250 or more volts per millimeter of electrode separation between said first and second electrodes, said first electrode being positively charged, the amount of electric potential being determined at least in part by the substantially constant distance separating said first and second electrodes, said electric potential when so established and maintained acting on the negatively charged soot particles to attract them toward said first electrode and coagulating the so attracted soot particles in the oil passing through said filter assembly into large masses so that the coagulated masses of soot particles are too large to pass through and beyond said second electrode, but are retained in the filter assembly between said electrodes and are subject to periodic removal.

10. In an oil filter assembly for removing negatively charged soot particles of about 1.0 micron maximum diameter and dispersed in oil, a filter housing having an inlet and an outlet, a first electrode having a large mesh configuration with mesh openings sufficiently large to let pass therethrough all of the dispersed soot particles, said first electrode being so positioned in said filter housing that oil entering said inlet must flow through the mesh openings of said first electrode to said outlet;

a second electrode having a large mesh configuration with mesh openings sufficiently large to let pass therethrough all of the dispersed soot particles, said second electrode being positioned in said filter housing at a substantially constant distance from said first electrode so that oil flowing through the mesh openings of said first electrode must then flow through the mesh openings of said second electrode to said outlet, the space between said electrodes being occupied only by the oil being filtered and particles dispersed therein in suspension;

and means for establishing and maintaining a D.C. electric potential between said first and second electrodes, said first electrode being positively charged and said second electrode being negatively charged, the amount of electric potential being determined at least in part by the substantially constant distance separating said first and second electrodes and within a range from about 250 volts per millimeter of electrode separation to a higher voltage limit which does not adversely effect the oil or additives therein, said electric potential when so established and maintained acting on said negatively charged soot particles in the oil passing through said filter assembly to attract them toward said first electrode and coagulating the particles so attracted into masses of greater size than the size of said second electrode mesh openings so that the coagulated masses of soot particles do not pass through and beyond said second electrode, but are retained in the filter assembly and are subject to periodic removal.

11. In an oil filter assembly for removing soot particles and the like particularly including soot particles of about 1.0 micron and less in diameter and dispersed in lubricating oil in an automotive engine;

a filter housing having an inlet and an outlet, a first cylindrically formed electrode having a large mesh configuration with mesh openings sufficiently large to let pass therethrough all of the dispersed soot particles and the like, said first electrode being so positioned in said filter housing that oil entering said inlet must flow through the mesh openings of said first electrode to said outlet;

a second cylindrically formed electrode having a large mesh configuration with mesh openings sufficiently large to let pass therethrough all of the dispersed soot particles and the like, said second electrode being positioned in said filter housing concentrically within and at a substantially constant radially inward distance from said first electrode so that oil flowing through the mesh openings of said first electrode must then flow radially inward and through the mesh openings of said second electrode to said outlet;

a non-conductive particle filter element positioned radially between said electrodes, the pore size of said non-conductive particle filter element being larger than the 8 micron to 40 micron pore size of oil filters in common automotive engine use, decreasing the pressure drop occurring across the filter assembly relative to the pressure drop occurring across such common use oil filters;

and means for establishing and maintaining a D.C. electric potential between said first and second electrodes, the amount of electric potential being determined at least in part by the substantially constant radially inward distance separating said first and second electrodes and on the order of 250 or more volts D.C. per millimeter of electrode separation, said electric potential when so established and maintained acting on soot particles and the like in the oil passing through said filter assembly to attract the soot particles and the like toward said first electrode and coagulating the particles so attracted into large masses of coagulated particles located primarily downstream of said first electrode and upstream of said second electrode, the large masses of coagulated particles being larger than the mesh openings of either of said electrodes and also larger than the pore size of said filter element, so that said coagulated masses of particles remain charged and attracted to said first electrode and tend to cling to said first electrode primarily on the downstream side thereof and do not pass through and beyond said second electrode but are retained by said attraction and said filter element and are subject to periodic removal.

12. The method of separating dispersed particles of soot or the like from oil in which the particles are dispersed, the soot particles being in a size range of about 0.005 micron to 1.0 micron in diameter, said method comprising the steps of:
   (1) providing a filter assembly having a first electrode and a second electrode in serially spaced flow relation at a substantially constant separation distance, the provided electrodes each having openings therethrough in the range of from about 0.0725 inch to 0.5 inch diameter or width and breadth;
   (2) flowing oil into the filter assembly and through the first electrode openings with particles therein to be separated being dispersed in the oil flowing into the filter assembly;
   (3) establishing and maintaining a D.C. electrical potential between the first and second electrodes within a range of about 250 to 2,000 volts D.C. per millimeter of electrode separation;
   (4) by the established and maintained D.C. electrical potential attracting soot particles, dispersed in the oil flowing into the filter assembly, toward the first electrode and coagulating the particles so attracted into masses of particles larger than the openings in the first and second electrodes;
   (5) and retaining the coagulated masses of particles within the filter assembly by coaction of at least one of the electrodes and the coagulated masses of particles while flowing the oil through the second electrode openings and out of the filter assembly.

13. The method of separating dispersed particles of soot or the like from oil in which the particles are dispersed, the soot particles being in the size range of about 0.005 micron to 1.0 micron in diameter, said method comprising the steps of:
   (1) providing a filter assembly having a first electrode and a second electrode in serially spaced flow relation at a substantially constant separation distance, the provided electrodes each having openings therethrough in a size range of from about 0.0725 inch to 0.5 inch diameter or width and breadth;
   (2) providing a filter element in flow relation between the first and second electrodes, the filter element having a nominal pore size in the range of about 8 to 100 microns;
   (3) flowing oil into the filter assembly and through the first electrode openings with particles therein to be separated being dispersed in the oil flowing into the filter assembly;
   (4) establishing and maintaining a D.C. electrical potential between the first and second electrodes of about 250 or more volts D.C. per millimeter of electrode separation;
   (5) by the established and maintained D.C. electrical potential attracting soot particles, dispersed in the oil flowing into the filter assembly, toward the first electrode and coagulating the particles so attracted into masses of particles of sizes greater than the nominal pore size of the filter element;
   (6) and retaining the coagulated masses of particles within the filter assembly by coaction of the filter element, at least one of the electrodes and the coagulated masses of particles while flowing the oil through the filtering element and the second electrode openings and out of the filter assembly.

14. The method of separating particles of soot or the like from oil in which the particles are dispersed, the soot particles having a negative electrical charge and being in the size range of about 0.005 micron to 1.0 micron in diameter, said method comprising the steps of:
   (1) providing a filter assembly having a first electrode and a second electrode in serially spaced flow relation at a substantially constant separation distance, the provided electrodes each having openings therethrough in a size range of from about 0.0725 inch to 0.5 inch diameter or width and breadth;
   (2) providing a filter element in flow relation between the first and second electrodes, the filter element having a nominal pore size in the range of about 8 to 100 microns;
   (3) flowing oil into the filter assembly and through the first electrode openings with particles to be separated being dispersed in the oil flowing into the filter assembly;
   (4) establishing and maintaining a D.C. electrical potential between the first and second electrodes of substantially 250 or more volts D.C. per millimeter of electrode separation with the first electrode being positively charged and the second electrode being negatively charged;
   (5) by the established and maintained D.C. electrical potential attracting negatively charged soot particles, dispersed in the oil flowing into the filter assembly, toward the positively charged first electrode and coagulating the particles so attracted into masses of particles all of which are of greater size than the filter element nominal pore size and at least some of which are of greater size than the openings through the electrodes;

(6) and retaining the coagulated masses of particles within the filter assembly by coaction of at least one of the electrodes, the filter element and the coagulated masses of particles while flowing the oil through the second electrode openings and out of the filter assembly.

15. The method of separating particles of soot or the like and other undesirable matter such as dirt and bits of metal from oil in which the particles and other undesirable matter are dispersed, the soot particles being in a size range of about 0.005 micron to 1.0 micron in diameter and the other undesirable matter to be filtered being in a size range up to about 100 microns in maximum diameter, said method comprising the steps of:

(1) providing a filter assembly having a first electrode and a second electrode in serially spaced flow relation at a substantially constant separation distance, the provided electrodes each having openings therethrough in a size range of from about 0.0725 inch to 0.5 inch diameter or width and breadth;

(2) providing a filter element in flow relation between the first and second electrodes, the filter element having a nominal pore size in a range of about 8 to 100 microns;

(3) flowing oil into the filter assembly and through the first electrode openings with particles and other undesirable matter therein to be separated being dispersed in the oil flowing into the filter assembly;

(4) establishing and maintaining a D.C. electrical potential between the first and second electrodes of substantially 250 to 2,000 volts D.C. per millimeter of electrode separation;

(5) by the established and maintained D.C. electrical potential attracting soot particles, dispersed in the oil flowing into the filter assembly, toward the first electrode and coagulating the particles so attracted into masses of particles of sizes greater than the nominal pore size of the filter element;

(6) retaining the coagulated masses of particles within the filter assembly by filtering coaction of the filter element, at least one of the electrodes and the coagulated masses of particles while flowing the oil through the filtering element and the second electrode openings and out of the filter assembly;

(7) and trapping the other undesirable matter to be separated within the filter element by action of the filter element to the extent the filter element pores are smaller than the other undesirable matter to be separated, and by coaction of the coagulated masses of particles and the filter element without regard to whether the filter element pores are smaller or larger than the other undesirable matter to be separated.

16. The method of separating particles of soot or the like from oil in which the particles are dispersed, the soot particles being electrically negatively charged and in a size range of about 0.005 micron to 1.0 micron in diameter, said method comprising the steps of:

(1) providing a filter assembly having a first electrode and a second electrode in serially spaced flow relation at a substantially constant separation distance, the provided electrodes each having openings therethrough in the range of from about 0.0725 inch to 0.5 inch diameter or width and breadth;

(2) increasing and maintaining the mobility of the soot particles dispersed in the oil by at least one of (a) establishing an oil temperature in the range of about 93° C. to 120° C., (b) increasing the average number of electrical negative charges per soot particle, and (c) decreasing the viscosity of the oil;

(3) flowing the oil to be filtered into the filter assembly and through the first electrode openings with particles therein to be separated being dispersed in the oil flowing into the filter assembly;

(4) establishing and maintaining a D.C. electrical potential between the first and second electrodes of about 250 to 2,000 volts D.C. per millimeter of electrode separation;

(5) by the established and maintained D.C. electrical potential attracting soot particles, dispersed in the oil flowing into the filter assembly, toward the first electrode and coagulating the particles so attracted into masses of particles of sizes greater than the openings in the electrodes;

(6) and retaining the coagulated masses of particles within the filter assembly while flowing the oil through the second electrode openings and out of the filter assembly.

17. The method of separating particles of soot or the like from oil in which the particles are dispersed, the soot particles having a negative electrical charge and being in a size range of about 0.005 micron to 1.0 micron in diameter, said method comprising the steps of:

(1) providing a filter assembly having a first electrode and a second electrode in serially spaced flow relation at a substantially constant separation distance, the provided electrodes each having openings therethrough in a size range of from about 0.0725 inch to 0.5 inch diameter or width and breadth;

(2) providing a filter element in flow relation between the first and second electrodes, the filter element having a nominal pore size in a range of about 8 to 100 microns;

(3) increasing and maintaining the mobility of the dispersed soot particles in the oil by at least one of (a) establishing an oil temperature in a range of about 93° C. to 120° C., (b) increasing the average number of negative electrical charges per soot particle, and (c) decreasing the viscosity of the oil;

(4) flowing the oil into the filter assembly and through the first electrode openings with particles to be separated being dispersed in the oil flowing into the filter assembly;

(5) establishing and maintaining a D.C. electrical potential between the first and second electrodes of about 250 volts per millimeter of electrode separation with the first electrode being positively charged and the second electrode being negatively charged;

(6) by the established and maintained D.C. electrical potential attracting negatively charged soot particles, dispersed in the oil flowing into the filter assembly, toward the positively charged first electrode and coagulating the particles so attracted into masses of particles of greater size than the filter element nominal pore size;

(7) and retaining the coagulated masses of particles within the filter assembly by coaction of the filter element, at least one of the electrodes and the coagulated masses of particles while flowing the oil through the second electrode openings and out of the filter assembly.

* * * * *